(12) United States Patent
Lee

(10) Patent No.: US 11,036,630 B2
(45) Date of Patent: Jun. 15, 2021

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 219 days.

(21) Appl. No.: 16/406,258

(22) Filed: May 8, 2019

(65) Prior Publication Data

US 2020/0104254 A1 Apr. 2, 2020

(30) Foreign Application Priority Data

Sep. 27, 2018 (KR) .......................... 10-2018-0114941

(51) Int. Cl.
*G06F 12/02* (2006.01)
(52) U.S. Cl.
CPC .................. *G06F 12/0253* (2013.01)
(58) Field of Classification Search
CPC ......... G06F 12/0253; G06F 2212/1044; G06F 12/0246; G06F 3/064
USPC ........................................................ 707/813
See application file for complete search history.

(56) References Cited

U.S. PATENT DOCUMENTS

| | | | | |
|---|---|---|---|---|
| 4,775,932 | A * | 10/1988 | Oxley ................. | G06F 12/0253 |
| 9,244,619 | B2 * | 1/2016 | Lee ....................... | G06F 3/0613 |
| 9,646,067 | B2 * | 5/2017 | Abercrombie .......... | G06F 16/27 |
| 10,141,060 | B1 * | 11/2018 | Iwai ....................... | G11C 16/16 |
| 10,496,330 | B1 * | 12/2019 | Bernat .................... | G06F 3/064 |
| 10,534,703 | B2 * | 1/2020 | Lee ........................ | G06F 3/0679 |
| 2005/0195660 | A1 * | 9/2005 | Kavuri .................... | G06F 3/0607 365/189.05 |

(Continued)

FOREIGN PATENT DOCUMENTS

| | | | |
|---|---|---|---|
| CN | 102147767 B | * | 4/2014 |
| JP | 2002278828 A | * | 9/2002 |

(Continued)

OTHER PUBLICATIONS

Kim et al., "Clustering data according to update frequency to reduce garbage-collection overhead in solid-state drives," IEICE Electronics Express, vol. 13, No. 1, 2016, pp. 1-8. (Year: 2016).*

(Continued)

*Primary Examiner* — Phuong Thao Cao
(74) *Attorney, Agent, or Firm* — IP & T Group LLP

(57) ABSTRACT

A memory system includes: a memory device; and a controller suitable for performing: a free block management operation of detecting victim blocks onto which a garbage collection operation is to be performed to generate required free blocks; a garbage collection operation time management operation of calculating an estimated garbage collection operation time for the detected victim blocks; and a garbage collection operation period management operation of dynamically changing a garbage collection operation period based on the estimated garbage collection operation time and periodically performing a garbage collection operation based on the garbage collection operation period during a specific time, wherein the controller repeatedly performs, whenever an update period arrives, the free block management operation, the garbage collection operation time management operation, and the garbage collection operation period management operation.

20 Claims, 17 Drawing Sheets

(56) References Cited

U.S. PATENT DOCUMENTS

| | | | |
|---|---|---|---|
| 2008/0034174 A1* | 2/2008 | Traister | G06F 12/0246 711/159 |
| 2008/0034175 A1* | 2/2008 | Traister | G06F 12/0246 711/159 |
| 2010/0157641 A1* | 6/2010 | Shalvi | G11C 16/349 365/45 |
| 2012/0036309 A1* | 2/2012 | Dillow | G06F 3/0688 711/103 |
| 2015/0012671 A1* | 1/2015 | Park | G11C 16/00 710/5 |
| 2016/0124847 A1* | 5/2016 | Malwankar | G06F 9/00 711/103 |
| 2017/0083436 A1* | 3/2017 | Jung | G06F 12/0246 |
| 2017/0115932 A1* | 4/2017 | Mitsumasu | G06F 12/0246 |
| 2017/0123700 A1* | 5/2017 | Sinha | G06F 12/0253 |
| 2017/0123972 A1* | 5/2017 | Gopinath | G06F 12/0253 |
| 2017/0285971 A1* | 10/2017 | Dai | G06F 12/0246 |
| 2019/0227927 A1* | 7/2019 | Miao | G06F 3/0658 |
| 2020/0019497 A1* | 1/2020 | Na | G06F 12/0246 |

FOREIGN PATENT DOCUMENTS

| | | |
|---|---|---|
| KR | 10-2013-0142103 | 12/2013 |
| KR | 10-2016-0044989 | 4/2016 |
| KR | 10-2016-0075229 | 6/2016 |
| KR | 10-2016-0110596 | 9/2016 |

OTHER PUBLICATIONS

Nagel et al., "Time-efficient Garbage Collection in SSDs," arXiv:1807.09313v1 [cs.PF], Jul. 24, 2018, 13 pages. (Year: 2018).*

Wang et al., "Data-centric Garbage Collection for NAND Flash Devices," 2015 IEEE Non-Volatile Memory System and Applications Symposium (NVMSA), 2015, 6 pages. (Year: 2015).*

* cited by examiner

FIG. 8
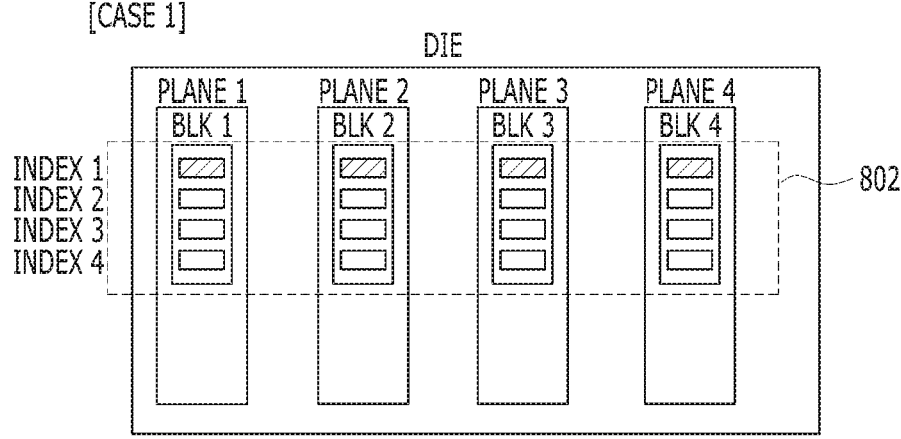
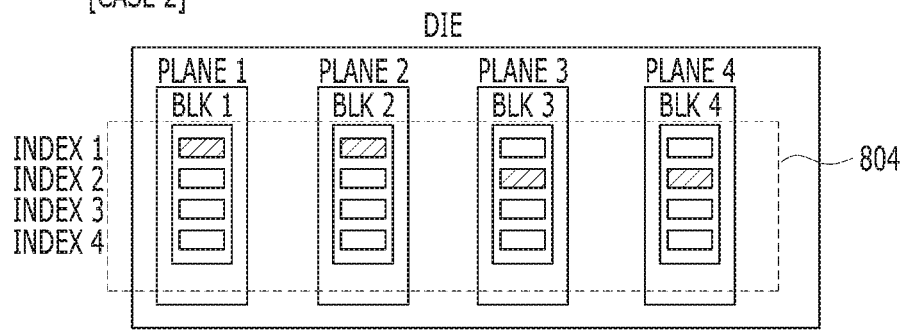
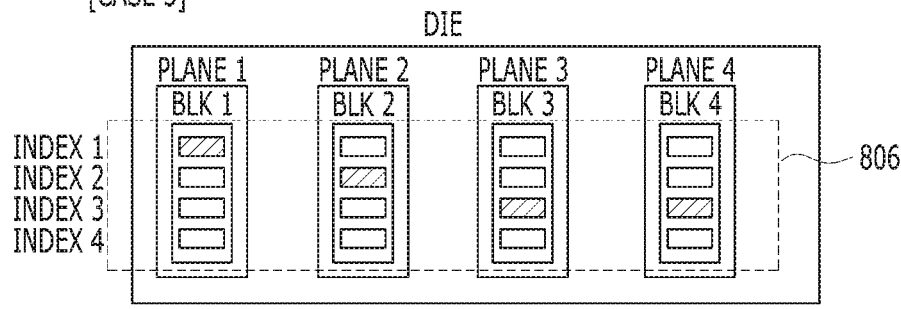
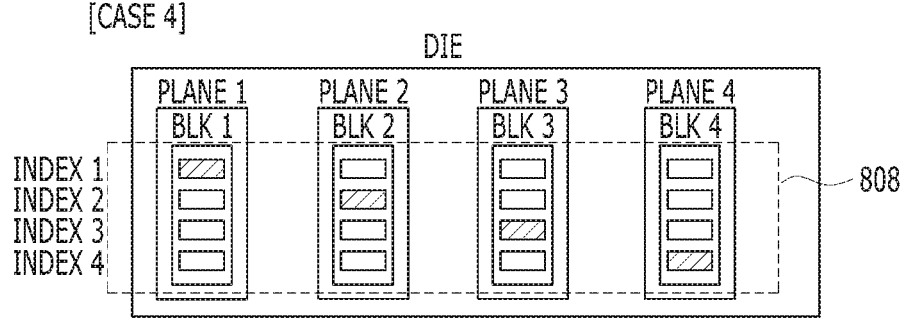

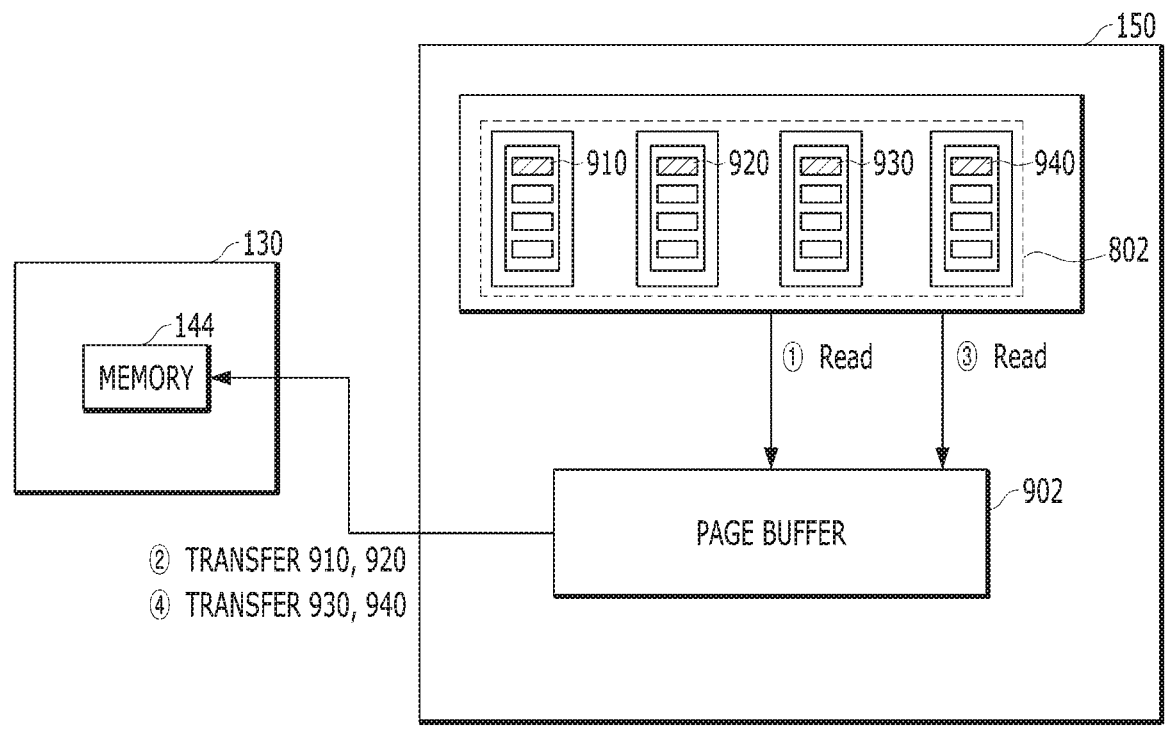

$T_{VICTIM} = T_{AVG1} + T_{AVG2} + T_{AVG3} + T_{AVG4}$

MEMORY SYSTEM AND OPERATING METHOD THEREOF

CROSS-REFERENCE TO RELATED APPLICATIONS

The present application claims priority of Korean Patent Application No. 10-2018-0114941, filed on Sep. 27, 2018, which is incorporated herein by reference in its entirety.

BACKGROUND

1. Field

Exemplary embodiments of the present invention relate to a memory system, and more particularly, to a memory system and an operation method thereof for efficiently performing a garbage collection operation.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Embodiments of the present invention are directed to a memory system capable of dynamically changing a garbage collection trigger period based on an estimated time for performing a garbage collection operation.

In accordance with an embodiment of the present invention, a memory system includes: a memory device; and a controller suitable for performing: a free block management operation of detecting victim blocks onto which a garbage collection operation is to be performed to generate required free blocks; a garbage collection operation time management operation of calculating an estimated garbage collection operation time for the detected victim blocks; and a garbage collection operation period management operation of dynamically changing a garbage collection operation period based on the estimated garbage collection operation time and periodically performing a garbage collection operation based on the garbage collection operation period during a specific time, wherein the controller repeatedly performs, whenever an update period arrives, the free block management operation, the garbage collection operation time management operation, and the garbage collection operation period management operation.

In accordance with another embodiment of the present invention, a method for operating a memory system includes: a free block management operation of detecting victim blocks onto which a garbage collection operation is to be performed to generate required free blocks; a garbage collection operation time management operation of calculating an estimated garbage collection operation time for the detected victim blocks; and a garbage collection operation period management operation of dynamically changing a garbage collection operation period based on the estimated garbage collection operation time and periodically performing a garbage collection operation based on the garbage collection operation period during a specific time, wherein the free block management operation, the garbage collection operation time management operation and the garbage collection operation period management operation are repeatedly performed whenever an update period arrives.

In accordance with an embodiment of the present invention, a memory system includes: a memory device including one or more memory blocks respectively having predetermined distribution patterns of valid pages and one or more victim blocks; and a controller suitable for: measuring plural pieces of time respectively taken for test garbage collection operations to the predetermined distribution patterns of valid pages; estimating garbage collection operation time based on the plural pieces of time; updating a period for a periodical garbage collection operation to the victim blocks based on the estimated garbage collection operation time and predetermined time required for the periodical garbage collection operation; and controlling the memory device to perform the periodical garbage collection operation to the victim blocks based on the updated period.

BRIEF DESCRIPTION OF THE DRAWINGS

FIG. 8 is a diagram illustrating a plurality of cases classified based on valid page distribution.

FIG. 9 is a block diagram illustrating an operation of changing a method of reading valid pages for a super block 802 corresponding to a first case VPC_CASE1.

FIG. 10 is a diagram illustrating a table of garbage collection operation times and an average garbage collection operation time.

DETAILED DESCRIPTION

Figure 1:
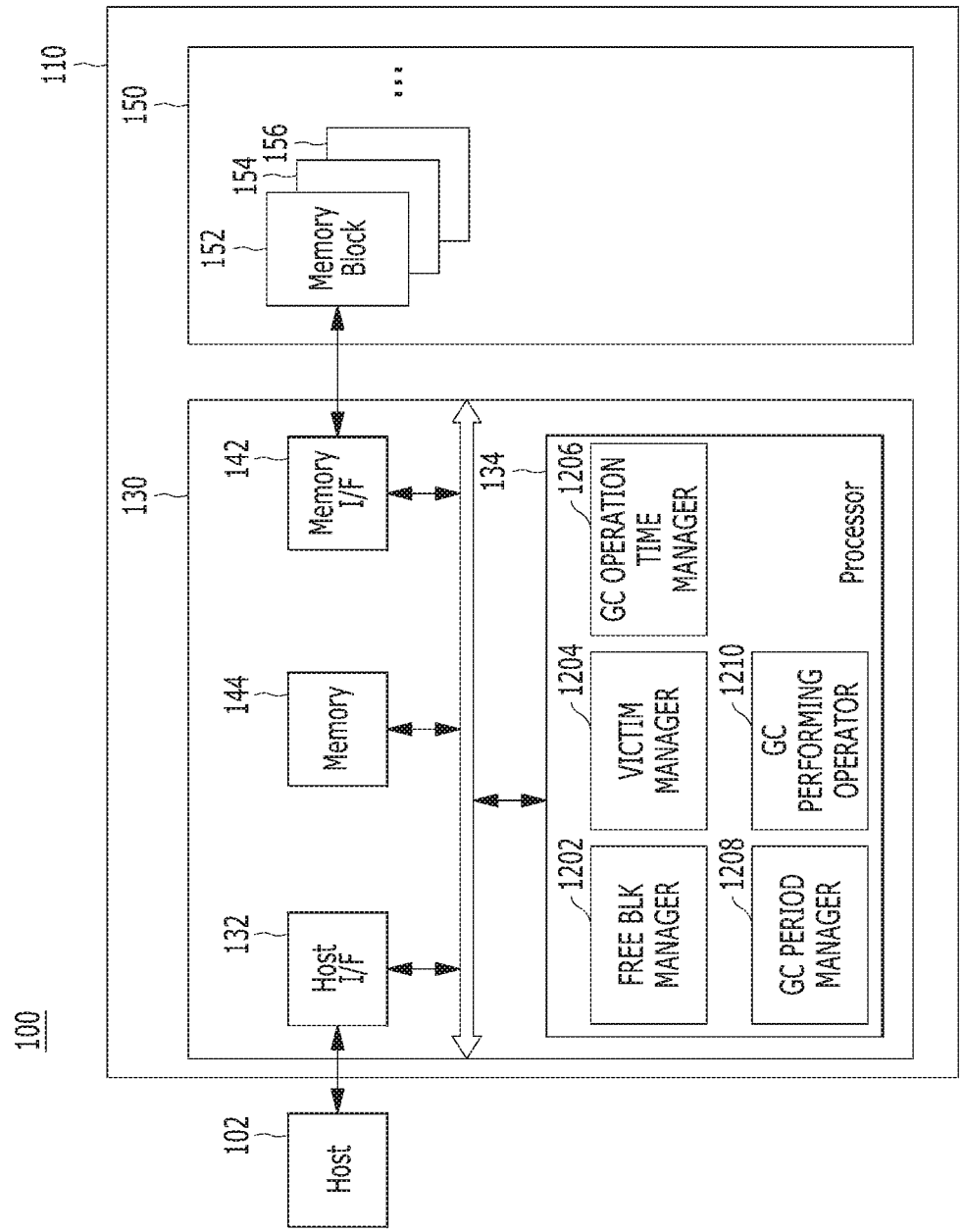
FIG. 1 is a block diagram illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands which correspond to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

Herein, the structure of the memory device 150 and the three-dimensional stereoscopic stack structure of the memory device 150 will be described later in more detail with reference to FIGS. 12 to 14.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

More specifically, the controller 130 may include a host interface (I/F) 132, a processor 134, a memory interface 142, and a memory 144, all operatively coupled or engaged via an internal bus. The processor 134 may include a free block manager 1202, a victim manager 1204, a garbage collection (GC) operation time manager 1206, a GC period manager 1208, and a GC operator 1210, which will be described below with reference to FIG. 12.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150, and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a GC (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

Figure 2:
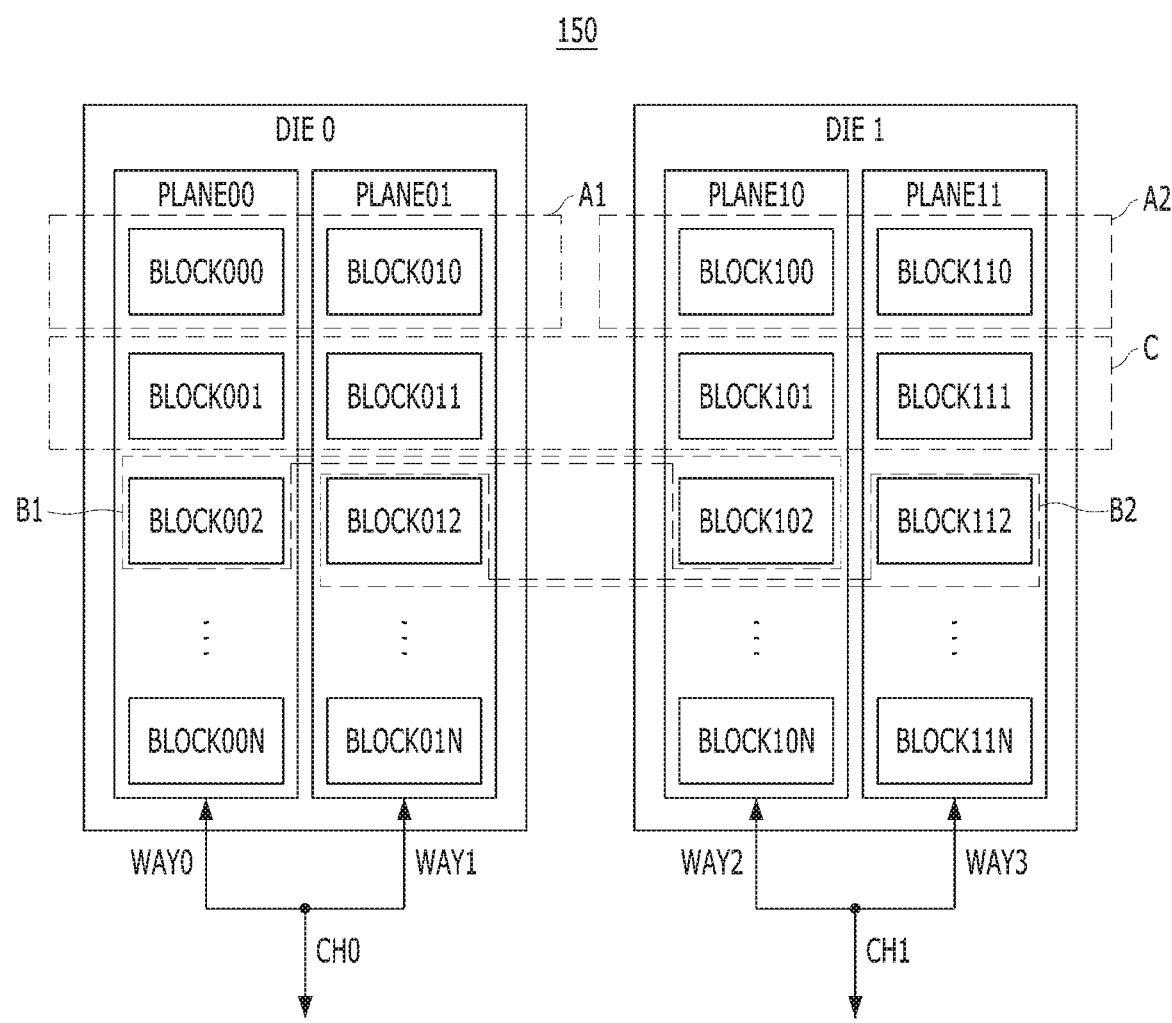
FIG. 2 is a block diagram illustrating a concept of a super memory block used in a memory system in accordance with an embodiment of the present invention.

FIG. 2 is a diagram illustrating a concept of a super memory block used in a memory system in accordance with an embodiment of the present invention.

FIG. 2 illustrates in detail constituent elements of the memory device 150 among the constituent element of the memory system 110 shown in FIG. 1 in accordance with an embodiment of the present invention.

The memory device 150 may include a plurality of memory blocks BLOCK000 to BLOCK00N, BLOCK010 to BLOCK01N, BLOCK100 to BLOCK10N and BLOCK110 to BLOCK11N.

In addition, the memory device 150 may include a first is memory die DIE0 capable of inputting/outputting data through a zeroth channel CH0 and a second memory die DIE1 capable of inputting/outputting data through a first channel CH1. The zeroth and first channels CH0 and CH1 may input/output data in an interleaving scheme.

The first memory die DIE0 may include a plurality of planes PLANE00 and PLANE01 respectively corresponding to a plurality of ways WAY0 and WAY1. The ways WAY0 and WAY1 may input/output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input/output data in the interleaving scheme by sharing the first channel CH1.

The first plane PLANE00 of the first memory die DIE0 may include a predetermined number of memory blocks BLOCK000 to BLOCK00N among the plurality of memory blocks BLOCK000 to BLOCK00N, BLOCK010 to BLOCK01N, BLOCK100 to BLOCK10N and BLOCK110 to BLOCK11N.

The second plane PLANE01 of the first memory die DIE0 may include a predetermined number of memory blocks BLOCK100 to BLOCK01N among the plurality of memory blocks BLOCK000 to BLOCK00N, BLOCK010 to BLOCK01N, BLOCK100 to BLOCK10N and BLOCK110 to BLOCK11N.

The first plane PLANE10 of the second memory die DIE1 may include a predetermined number of memory blocks BLOCK100 to BLOCK10N among the plurality of memory blocks BLOCK000 to BLOCK00N, BLOCK010 to BLOCK01N, BLOCK100 to BLOCK10N and BLOCK110 to BLOCK11N.

The second plane PLANE11 of the second memory die DIE1 may include a predetermined number of memory blocks BLOCK110 to BLOCK11N among the plurality of memory blocks BLOCK000 to BLOCK00N, BLOCK010 to BLOCK01N, BLOCK100 to BLOCK10N and BLOCK110 to BLOCK11N.

In this manner, the plurality of memory blocks BLOCK000 to BLOCK00N, BLOCK010 to BLOCK01N, BLOCK100 to BLOCK10N, and BLOCK110 to BLOCK11N included in the memory device 150 may be divided into groups, according to their physical locations and their use of the ways and channels.

Although it is described in the embodiment of the present invention that two memory dies DIE0 and DIE1 are included in the memory device 150, two planes PLANE00 and PLANE01/PLANE10 and PLANE11 are included in the respective memory dies DIE0 and DIE1, and the predetermined number of memory blocks BLOCK000 to BLOCK00N, BLOCK010 to BLOCK01N, BLOCK100 to BLOCK10N and BLOCK110 to BLOCK11N are included in the respective planes PLANE00 and PLANE01/PLANE10 and PLANE11, the invention is not limited in this way. In actuality, more or fewer memory dies than two may be included in the memory device 150, more or fewer planes than two may be included in the respective memory dies, according to the decision of a system designer. Additionally, the predetermined number of memory blocks included in the respective planes also may be adjusted variously according to the decision of the system designer.

Different from a way to divide the plurality of memory blocks BLOCK000 to BLOCK00N, BLOCK010 to BLOCK01N, BLOCK100 to BLOCK10N and BLOCK110 to BLOCK11N included in the memory device 150 depending on their physical locations such as the memory dies DIE0 and DIE1 or the planes PLANE00 and PLANE01/PLANE10 and PLANE11, the controller 130 may use a way to divide the plurality of memory blocks BLOCK000 to BLOCK00N, BLOCK010 to BLOCK01N, BLOCK100 to BLOCK10N and BLOCK110 to BLOCK11N on a basis of memory blocks which are simultaneously selected and operate on those memory blocks which are selected. In other words, the controller 130 may manage a plurality of memory blocks which are located in different dies or different planes based on their physical locations, by grouping memory blocks capable of being selected simultaneously among the plurality of memory blocks and thereby dividing the grouped memory blocks into super memory blocks.

The simultaneous selection scheme of grouping the memory blocks into super memory blocks by the controller 130 may be performed in various manners according to the decision of the system designer. Herein, three simultaneous selection schemes will be exemplified as follows.

A first scheme is to group an arbitrary memory block BLOCK000 from the first plane PLANE00 and an arbitrary memory block BLOCK010 from the second plane PLANE01 of the first memory die DIE0 between the memory dies DIE0 and DIE1 included in the memory device 150 and manage the grouped memory blocks BLOCK000 and BLOCK010 as a single super memory block A1. When the first way is applied to the second memory die DIE1 between the memory dies DIE0 and DIE1 included in the memory device 150, the controller 130 may group an arbitrary memory block BLOCK100 from the first plane PLANE10 and an arbitrary memory block BLOCK110 from the second plane PLANE11 of the second memory the DIE1 and manage the grouped memory blocks BLOCK100 and BLOCK110 as a single super memory block A2.

A second scheme is to group an arbitrary memory block BLOCK002 from the first plane PLANE00 of the first memory die DIE0 and an arbitrary memory block BLOCK102 from the first plane PLANE10 of the second memory die DIE1 and manage the grouped memory blocks BLOCK002 and BLOCK102 as a single super memory block B1. In addition, according to the second way, the controller 130 may group an arbitrary memory block BLOCK012 from the second plane PLANE01 of the first memory die DIE0 and an arbitrary memory block BLOCK112 from the second plane PLANE11 of the second memory die DIE1 and manage the grouped memory blocks BLOCK012 and BLOCK112 as a single super memory block B2.

A third scheme is to group an arbitrary memory block BLOCK001 from the first plane PLANE00 of the first memory die DIE0, an arbitrary memory block BLOCK011 from the second plane PLANE01 of the first memory die DIE0, an arbitrary memory block BLOCK101 from the first plane PLANE10 of the second memory die DIE1, and an arbitrary memory block BLOCK111 from the second plane PLANE11 of the second memory die DIE1 and manage the grouped memory blocks BLOCK001, BLOCK011, BLOCK101 and BLOCK111 as a single super memory block C.

The simultaneously-selectable memory blocks included in the respective super memory blocks may be substantially simultaneously selected by the controller 130 through an interleaving scheme, for example, a channel interleaving scheme, a memory die interleaving scheme, a memory chip interleaving scheme or a way interleaving scheme.

Figure 3:
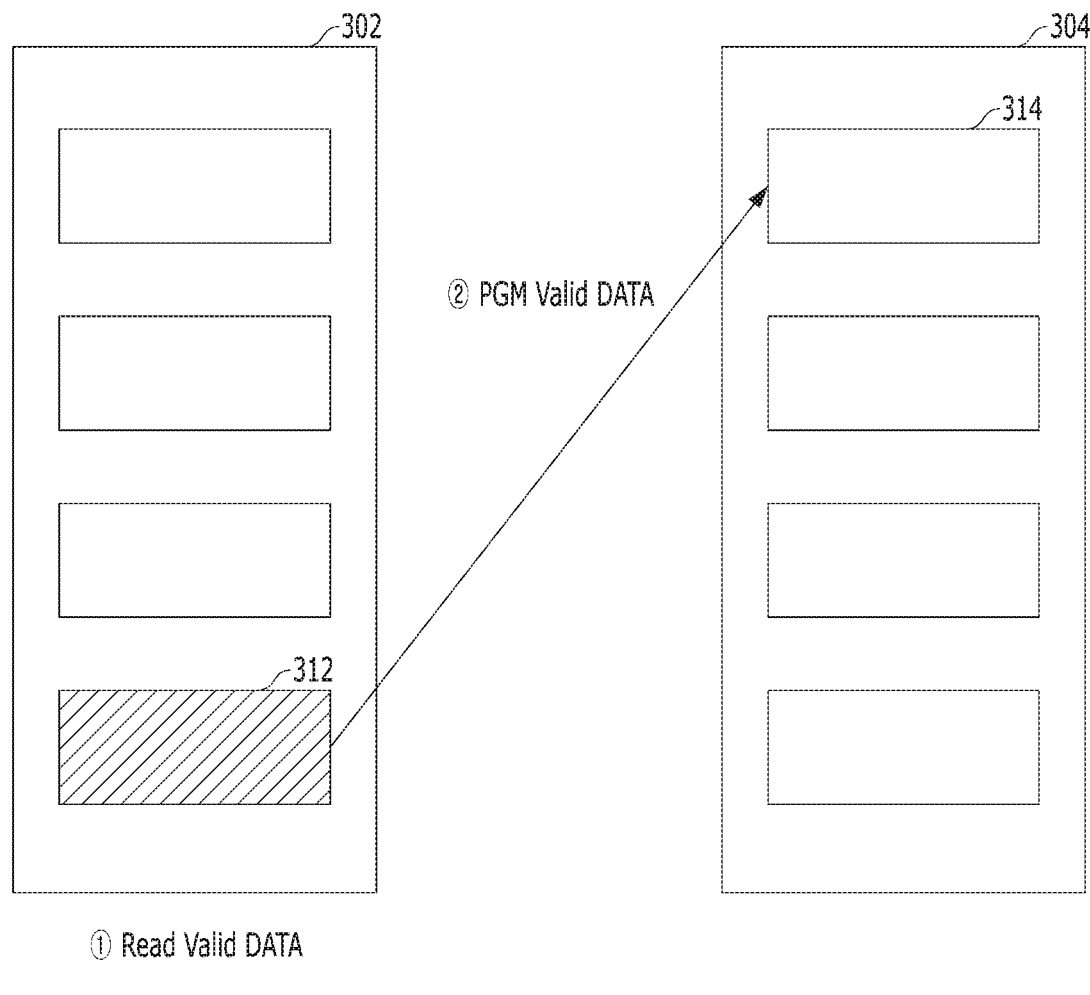
FIG. 3 is a diagram illustrating a basic operation of garbage collection.

FIG. 3 illustrates a basic GC operation.

Due to the characteristics of a nonvolatile memory element, the nonvolatile memory device may perform a program operation and a read operation on a page basis, perform an erase operation on a block basis but does not support an overwrite operation unlike a hard disk. Thus, the nonvolatile memory device may program a new version of data into a new page and invalidate the page of an original version of the data to update the data programmed into the page. The original version of the data becomes invalid data and the new version of the data becomes valid data. The page storing the invalid data is an invalid page.

The GC operation may be an operation of periodically converting an invalid page into a blank page in order to prevent waste of the nonvolatile memory space due to invalid pages produced in the process of modifying data. The GC operation may include a valid data read operation for reading a valid data programmed into a valid page 312 of a victim block 302, a valid data program operation for programming the valid data into a blank page 314 of a target block 304, and a map update operation for updating map information of the valid data moved from the victim block 302 to the target block 304. Although the victim block 302 and the target block 304 are illustrated as individual blocks, they may be super blocks each of which includes a plurality of blocks.

Figure 4:
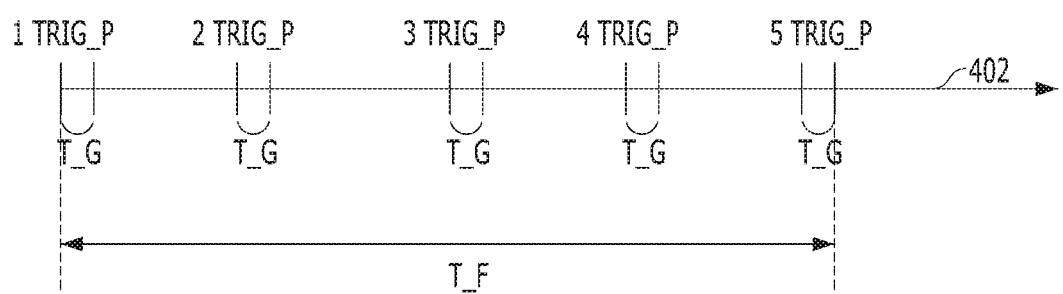
FIG. 4 is a diagram illustrating a garbage collection operation.

FIG. 4 illustrates a GC operation according to a prior art.

For the sake of convenience in description, a number of free blocks required for the memory device 150 during a specific time T_F is defined as a required free block number REQ_FREEBLK, and a number of free blocks generated by a GC operation during the specific time T_F is defined as a generated free block number GEN_FREEBLK.

The controller 130 may control the memory device 150 to perform a GC operation during a GC operation time T_GC having a constant value at each of the first to fifth GC trigger points 1 TRIG_P to 5 TRIG_P. According to the prior art, the GC operation period is fixed rather than changed dynamically. The GC operation period may mean the interval between two neighboring GC trigger points among the first to fifth GC trigger points 1 TRIG_P to 5 TRIG_P, for example, the GC operation period may mean the interval between the first GC trigger point 1 TRIG_P and the second GC trigger point 2 TRIG_P. Therefore, there may be a problem of not securing the memory space or a problem of unnecessarily deteriorated performance of a foreground operation due to the sizes of the required free block number REQ_FREEBLK and the generated free block number GEN_FREEBLK.

For example, a case where the required free block number REQ_FREEBLK is greater than the generated free block number GEN_FREEBLK means that the memory device 150 cannot generate free blocks for as many as the number of free blocks required by the memory device 150 through the GC operation performed during the specific time T_F. Accordingly, enough memory space may not be secured, which is problematic. On the other hand, a case where the required free block number REQ_FREEBLK is smaller than the generated free block number GEN_FREEBLK means that the memory device 150 generates free blocks for as many as the required free block number REQ_FREEBILK or more by performing the GC operation during the specific time T_F. Accordingly, the memory device 150 may perform a GC operation more frequently than necessary. If the memory device 150 frequently performs a background operation such as the GC operation, there may be a problem in that the performance of the foreground operation may be deteriorated.

According to an embodiment of the present invention, the controller 130 may detect victim blocks NUM_VICTIM onto which a GC operation is required to be performed to generate the free blocks for as many as the required free block number REQ_FREEBLK. The controller 130 may estimate the time required for performing a GC operation onto the detected victim blocks. The controller 130 may determine the number of times that the GC operation is to be performed during the specific time T_F based on the estimated time, and may dynamically change the period of the GC operation such that the GC operation may be performed at an equal interval during the specific time T_F. The controller 130 may control the memory device 150 to perform the GC operation according to the changed GC operation period, thereby minimizing the performance deterioration of a foreground operation while securing the memory space.

Figure 5:
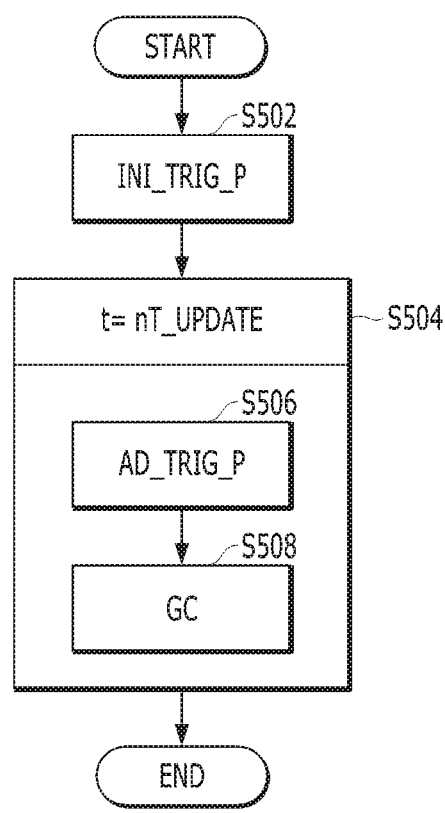
FIG. 5 is a flowchart describing an operation of a memory system 110 in accordance with an embodiment of the present invention.

FIG. 5 is a flowchart describing an operation of the memory system 110 in accordance with an embodiment of the present invention.

In step S502, the controller 130 may control the memory device 150 to perform a GC operation according to an initial GC operation period INI_TRIG_P. The controller 130 may control the memory device 150 to perform a GC operation onto the victim blocks during the GC operation time T_GC having a constant value whenever the initial GC operation period INI_TRIG_P arrives.

In step S504, the controller 130 may control the GC operation of the memory device 150 by periodically changing the GC operation period. According to the embodiment of the present invention, the controller 130 may control the memory device 150 to perform an operation of changing the GC operation period AD_TRIG_P whenever an update period T_UPDATE arrives in step S506, and to repeatedly perform the GC operation of step S508 according to the changed GC operation period AD_TRIG_P.

Figure 6:
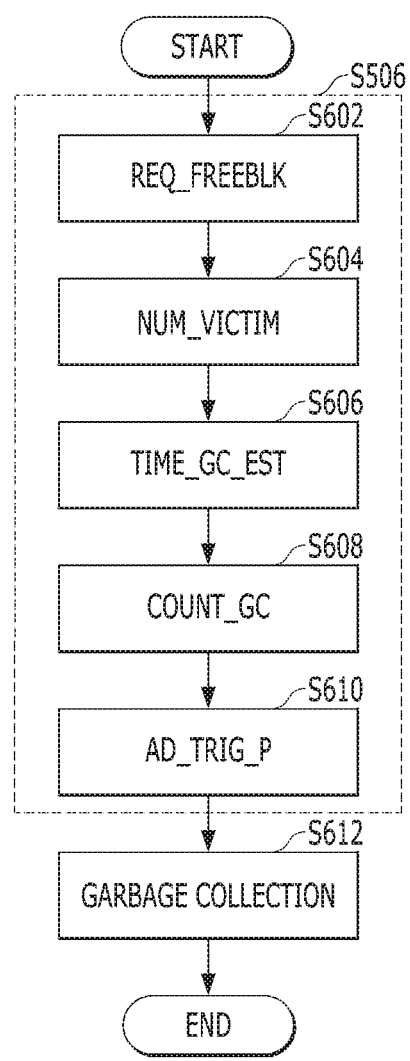
FIG. 6 is a flowchart describing an operation of changing a garbage collection operation period.

FIG. 6 is a flowchart describing the step S506 of changing a GC operation period.

In step S602, the controller 130 may calculate a required free block number REQ_FREEBLK. As previously defined in FIG. 4, the required free block number REQ_FREEBLK may be the number of free blocks required by the memory device 150 during a specific time T_F. The controller 130 may calculate the required free block number REQ_FREEBLK based on the size of a program command and the number of free blocks existing in the memory device 150. The size of a program command may represent a size of data to be programmed in response to the program command. For example, as the size of the program command becomes larger than the number of free blocks existing in the memory device 150, the required free block number REQ_FREEBLK may become greater. On the contrary, as the size of the program command becomes smaller than the number of free blocks existing in the memory device 150, the required free block number REQ_FREEBLK may become smaller.

In step S604, the controller 130 may detect victim blocks NUM_VICTIM onto which a GC operation is required to be performed to generate free blocks for as many as the required free block number REQ_FREEBLK obtained in the step S602. According to the embodiment of the present invention, when a GC operation is performed one or more times for the specific time T_F, the controller 130 may detect victim blocks NUM_VICTIM for as many that are required to generate free blocks of the required free block number REQ_FREEBLK.

In step S606, the controller 130 may estimate a GC operation time TIME_GC_EST that is to be taken to perform the GC operation onto the victim blocks detected in the step S604. According to the embodiment of the present invention, the controller 130 may classify memory blocks into a plurality of cases based on the distribution of valid pages included in the memory blocks, and control the memory device 150 to perform the GC operation onto the memory blocks according to the classified cases. The controller 130 may measure the time required for performing the GC operation for each of the cases, and may calculate the estimated GC operation time TIME_GC_EST based on the measured result.

Figure 7:
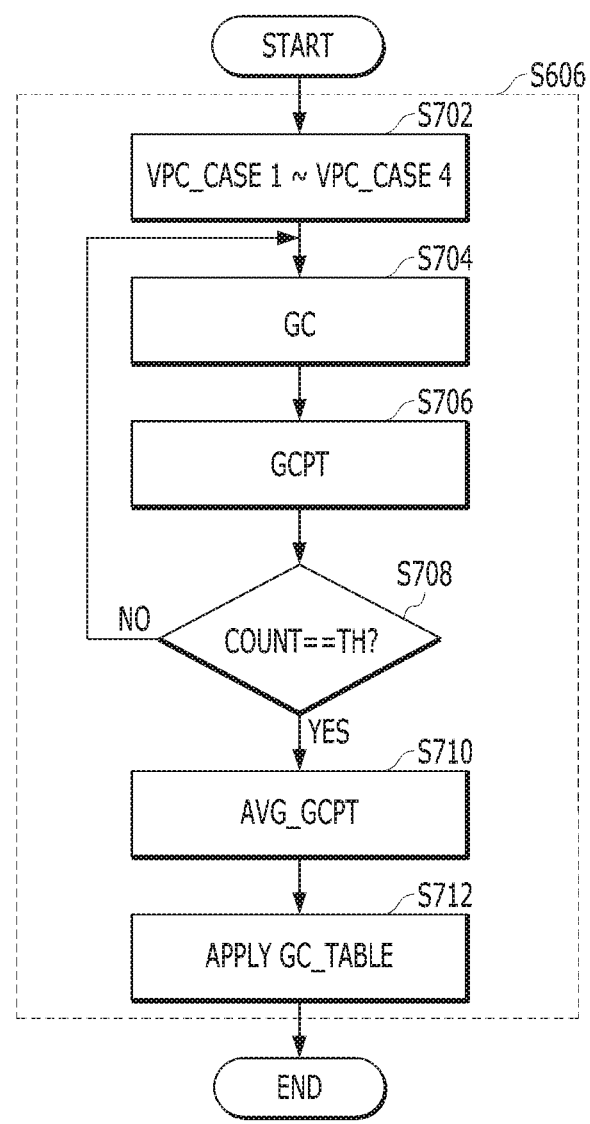
FIG. 7 is a flowchart describing an operation of calculating an estimated garbage collection operation time.

FIG. 7 is a flowchart describing an operation for calculating an estimated GC operation time.

In step S702, the controller 130 may classify memory blocks into a plurality of cases based on the valid page distribution within the memory blocks. According to the embodiment of the present invention, the controller 130 may classify super blocks into first to fourth cases VPC_CASE1 to VPC_CASE4 based on the valid page distribution within the super blocks. Each of the super blocks may include first to fourth memory blocks BLK1 to BLK4 respectively included in the first to fourth planes PLANE1 to PLANE4, and the first to fourth planes PLANE1 to PLANE4 may be all included in the same die DIE.

FIG. 8 illustrates a plurality of cases classified based on the valid page distribution.

For the sake of convenience in description, it is assumed that the number of pages that the controller 130 may read at one time is four. In case of reading data stored in a super block which is described above with reference to FIG. 2, the controller 130 may control the memory device 150 to simultaneously read the data stored in the pages of the same index among the pages included in different memory blocks. The pages of the same index may be included in the different planes and disposed at the same row among the pages included in the super block.

According to the embodiment of the present invention, in the case of a first super block 802 where four valid data are positioned on one index, e.g., the first index INDEX 1 as shown in FIG. 8, the controller 130 may classify a first super block 802 as a first case VPC_CASE1. The controller 130 may control the memory device 150 to read the four valid data positioned on the first index INDEX 1 of the first super block 802 through a read operation that is performed once.

Also, the controller 130 may classify a second super block 804 where four valid data are positioned on two indices, e.g., the first and second indices INDEX 1 and INDEX 2, as a second case VPC_CASE2. The controller 130 may control the memory device 150 to read the four valid data positioned on the first and second indices INDEX 1 and INDEX 2 of the second super block 804 through read operations that are performed twice.

Also, the controller 130 may classify a third super block 806 where four valid data are positioned on three indices, e.g., the first to third indices INDEX 1 to INDEX 3, as a third case VPC_CASE3. The controller 130 may control the memory device 150 to read the four valid data positioned on the first to third indices INDEX 1 to INDEX 3 of the third super block 806 through a read operation that is performed three times.

Also, the controller 130 may classify a fourth super block 808 where four valid data are positioned on four indices, e.g., the first to fourth indices INDEX 1 to INDEX 4, as a fourth case VPC_CASE4. The controller 130 may control the memory device 150 to read the four valid data positioned on the first to fourth indices INDEX 1 to INDEX 4 of the fourth super block 808 through a read operation that is performed four times.

The controller 130 may detect a super block in which a number of valid pages is less than a predetermined threshold as a victim super block. The read operation may have to be performed more times in order for the memory device 150 to read the valid pages of the same number as the valid pages are further distributed in the victim super block. Thus, according to the embodiment of the present invention, the controller 130 may classify the super blocks into a plurality of cases based on the distribution of valid pages within the super blocks. The distribution of valid pages may be related to the number of times that a read operation is required to be performed to read the valid pages of the same number.

Referring back to FIG. 7, in step S704, the controller 130 may control the memory device 150 to perform a GC operation onto the super blocks respectively corresponding to the cases classified in the step S702. Specifically, the controller 130 may control the memory device 150 to perform the GC operation onto the memory blocks included in each of the super blocks. As exemplified in FIG. 8, the controller 130 may control the memory device 150 to perform the GC operation of reading data stored in the valid pages of the super blocks 802 to 808 respectively corresponding to the first to fourth cases VPC_CASE1 to VPC_CASE4 and programming the read valid data into a target super block.

According to another embodiment of the present invention, when the memory device 150 does not include the second to fourth super blocks 804 to 808 corresponding to the second to fourth cases VPC_CASE2 to VPC_CASE4 except for the super block 802 corresponding to the first case VPC_CASE1, the controller 130 may perform a read operation onto the super block 802 corresponding to the first case VPC_CASE1 for as many times as required respectively for the second to fourth super blocks 804 to 808 corresponding to the second to fourth cases VPC_CASE2 to VPC_CASE4 in order to estimate the GC operation time for each of the second to fourth super blocks 804 to 808 corresponding to the second to fourth cases VPC_CASE2 to VPC_CASE4. As described with reference to FIG. 8, the read operation is performed one to four times to read valid pages of the first to fourth super blocks 802 to 808 corresponding to the first to fourth cases VPC_CASE1 to VPC_CASE4, respectively, for a GC operation. When the memory device 150 does not include the second to fourth super blocks 804 to 808 corresponding to the second to fourth cases VPC_CASE2 to VPC_CASE4 except for the super block 802 corresponding to the first case VPC_CASE1, read operation times for the second to fourth super blocks 804 to 808 corresponding to the second to fourth cases VPC_CASE2 to VPC_CASE4 may be measured through the read operation onto the super block 802 corresponding to the first case VPC_CASE1. The respectively measured read operation times for the second to fourth super blocks 804 to 808 corresponding to the second to fourth cases VPC_CASE2 to VPC_CASE4 may be used is to estimate the GC operation time for each of the second to fourth super blocks 804 to 808 corresponding to the second to fourth cases VPC_CASE2 to VPC_CASE4.

FIG. 9 is a block diagram illustrating the GC operation to the super block 802 corresponding to the first case VPC_CASE1 in order to estimate the GC operation time for the second super block 804 corresponding to the second case VPC_CASE2.

When the memory device 150 does not include the super block 804 corresponding to the second case VPC_CASE2 but includes the super blocks 802 corresponding to the first case VPC_CASE1, the controller 130 may use the super block 802 corresponding to the first case VPC_CASE1 in order to estimate the GC operation time for the super block 804 corresponding to the second case VPC_CASE2.

As described above with reference to FIG. 3, the GC operation may include a valid data read operation. The valid data read operation may include an operation of reading the valid data of a memory block and buffering the valid data into a page buffer, and an operation of providing the memory 144 of the controller 130 with the buffered valid data. According to the embodiment of the present invention, the controller 130 may control the memory device 150 to first read valid data 910 to 940 stored in the super block 802 corresponding to the first case VPC_CASE1, buffer the valid data 910 to 940 into a page buffer 902, and then provide the memory 144 with only the valid data 910 and 920 among the valid data 910 to 940. The controller 130 may control the memory device 150 to secondly read the valid data 910 to 940 stored in the super block 802 corresponding to the first case VPC_CASE1 again and buffer the valid data 910 to 940 into the page buffer 902. The controller 130 may control the memory device 150 to provide the memory 144 with the remaining valid data 930 and 940.

As described above, the controller 130 may perform a read operation twice to the super block 802 corresponding to the first case VPC_CASE1 and provide the memory 144 with the read valid data 910 to 940. Accordingly, the GC operation time for the super block 804 corresponding to the second case VPC_CASE2 may be measured through a GC operation for the super block 802 corresponding to the first case VPC_CASE1.

In a similar manner, the controller 130 may control the memory device 150 to perform a read operation three times and four times to the super block 802 corresponding to the first case VPC_CASE1 in order to measure the GC operation times for the super blocks 806 and 808 corresponding to the third case VPC_CASE3 and the fourth case VPC_CASE4, respectively.

Referring back to FIG. 7, in step S706, the controller 130 may measure the GC operation time GCPT required for each of the plurality of cases VPC_CASE1 to VPC_CASE4. According to the embodiment of the present invention, the controller 130 may measure the time from a moment when a GC operation is performed onto the super blocks 802 to 808 corresponding to the first to fourth cases VPC_CASE1 to VPC_CASE4, respectively, to a moment when the GC operation is completed, and the time may be recorded in a separate memory space. For example, the controller 130 may calculate the GC operation time GCPT by measuring the time from a moment when the valid data stored in a victim super block are read to a moment when the valid data are programmed into a target super block and a map update operation is completed.

As described above, when the memory device 150 does not include the second to fourth super blocks 804 to 808 corresponding to the second to fourth cases VPC_CASE2 to VPC_CASE4 except for the super block 802 corresponding to the first case VPC_CASE1, the GC operation time GCPT for each of the second to fourth super blocks 804 to 808 corresponding to the second to fourth cases VPC_CASE2 to VPC_CASE4 may be measured through the read operation performed twice to four times onto the super block 802 corresponding to the first case VPC_CASE1.

In step S708, the controller 130 may check whether a GC operation time measurement count COUNT has reached a predetermined threshold value TH or not. The GC operation time measurement count COUNT may represent a number of times that the garbage collection operation time GCPT is measured on each of the super blocks 802 to 808 corresponding to the first to fourth cases VPC_CASE1 to VPC_CASE4. When the GC operation time measurement count COUNT has not reached the predetermined threshold value TH ('NO' in the step S708), the controller 130 may go back to the steps S704 and S706 to repeat the operation of measuring the GC operation time GCPT. The controller 130 may measure the GC operation time GCPT_1 to GCPT_TH as much as the predetermined threshold value TH for each of the super blocks 802 to 808 corresponding to the cases VPC_CASE1 to VPC_CASE4 and record the measured GC operation times GCPT_1 to GCPT_TH in a separate memory space.

When the GC operation time measurement count COUNT reaches the predetermined threshold value TH ('YES' in the step S708), the controller 130 may stop the operation of measuring the GC operation time GCPT and go to an operation of step S710. According to the embodiment of the present invention, the controller 130 may repeat the operation of measuring the GC operation time GCPT for the super blocks 802 to 808 corresponding to the first to fourth cases VPC_CASE1 to VPC_CASE4 for as many times as the predetermined threshold value TH. The controller 130 may record the measured result in a separate memory space.

In step S710, the controller 130 may calculate an average GC operation time AVG_GCPT for the GC operation times GCPT_1 to GCPT_TH for the super blocks 802 to 808 corresponding to the first to fourth cases VPC_CASE1 to VPC_CASE4. The controller 130 may calculate the average GC operation time AVG_GCPT by dividing the sum of the GC operation times GCPT_1 to GCPT_TH by the predetermined threshold value TH.

FIG. 10 shows a table of GC operation times GCPT_1 to GCPT_TH and the average GC operation time AVG_GCPT.

According to the embodiment of the present invention, the controller 130 may store the GC operation times GCPT for the super blocks 802 to 808 respectively corresponding to the first to fourth cases VPC_CASE1 to VPC_CASE4 in a separate memory space in a form of a table 1002. The controller 130 may record the measured value in the table 1002, whenever a GC operation is performed onto the super blocks 802 to 808 respectively corresponding to the first to fourth cases VPC_CASE1 to VPC_CASE4. For example, referring to the table 1002 shown in FIG. 10, a first GC operation time GCPT_1 and a second GC operation time GCPT_2 for the super block 802 corresponding to the first case VPC_CASE1 are $T_{11}$ and $T_{12}$, respectively. The controller 130 may calculate the average AVG_GCPT of the GC operation times GCPT_1 to GCPT_TH for the super blocks 802 to 808 respectively corresponding to the first to fourth cases VPC_CASE1 to VPC_CASE4. The controller 130 may record the average GC operation time AVG_GCPT corresponding to each of the first to fourth cases VPC_CASE1 to VPC_CASE4 in the table 1002.

Referring back to FIG. 7, in step S712, the controller 130 may obtain the estimated GC operation time TIME_GC_EST by detecting each pattern of the cases VPC_CASE1 to VPC_CASE4 in the victim blocks detected in the step S604. The pattern may indicate the valid page distribution in a single super block, as described with reference to FIG. 8. According to the embodiment of the present invention, the controller 130 may analyze the valid data distribution of the detected victim blocks to detect each pattern of the cases VPC_CASE1 to VPC_CASE4 in the victim blocks. The controller 130 may calculate the estimated GC operation time TIME_GC_EST by multiplying the average GC operation times AVG_GCPT for each of the first to fourth cases VPC_CASE1 to VPC_CASE4 by a number of detection of each pattern of the cases VPC_CASE1 to VPC_CASE4 in the victim blocks and summing all the multiplied values.

Figure 11:
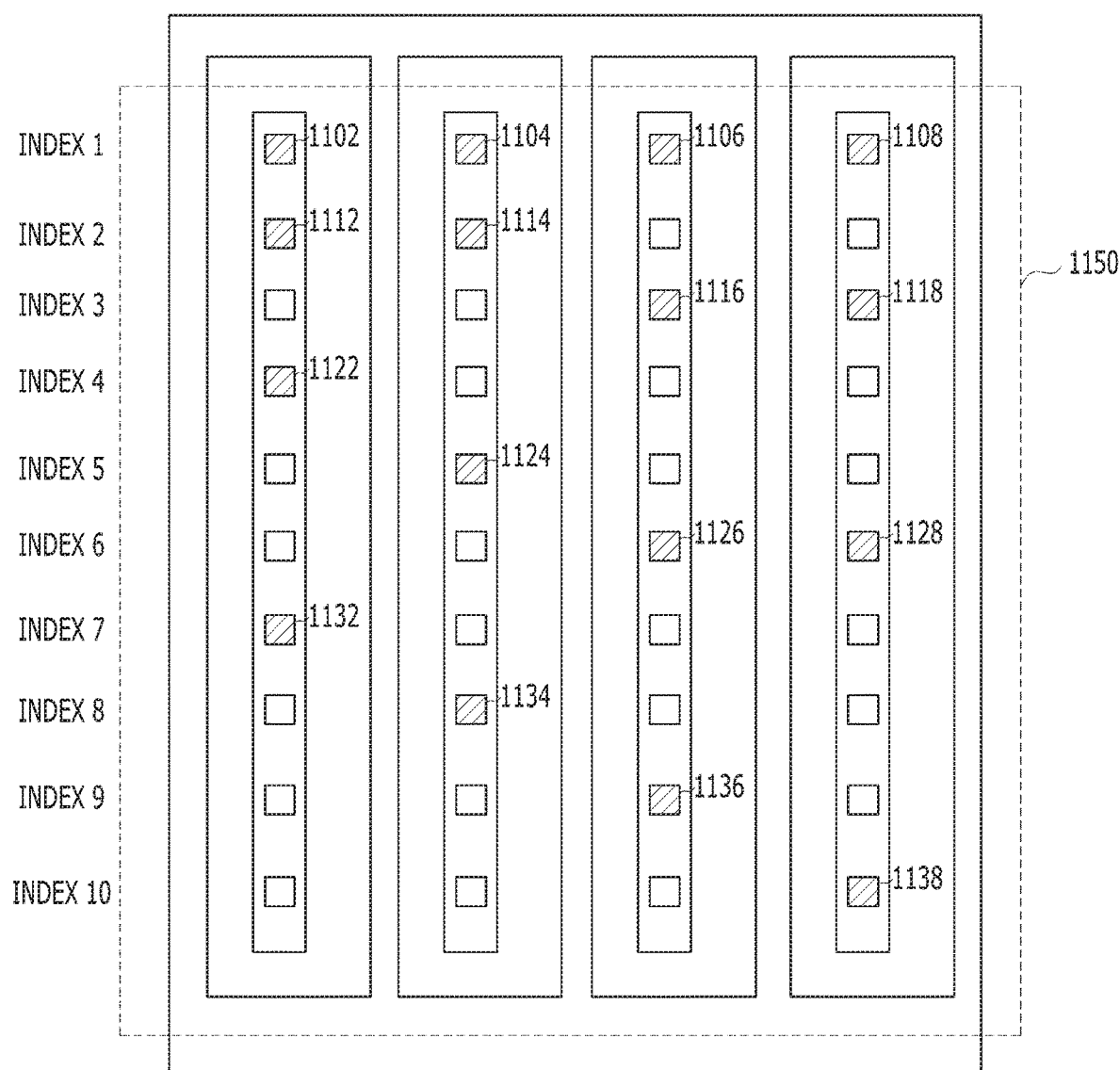
FIG. 11 is a diagram illustrating a method for calculating an estimated garbage collection operation time of a victim block.

FIG. 11 illustrates a method for calculating an estimated GC operation time of a victim block.

According to the embodiment of the present invention, the controller 130 may analyze the valid page distribution of a detected victim block 1150 to detect each pattern of the first to fourth cases VPC_CASE1 to VPC_CASE4 within the victim block 1150. For example, the controller 130 may detect the pattern of the first case VPC_CASE1 in the four valid pages 1102 to 1108 positioned on the first index INDEX 1 of the victim block 1150, detect the pattern of the second case VPC_CASE2 in the four valid pages 1112 to 1118 positioned on the second and third indices INDEX 2 and INDEX 3, and detect the pattern of the third case VPC_CASE3 in the four valid pages is 1122 to 1128 positioned on the fourth to sixth indices INDEX 4 to INDEX 6. Also, the controller 130 may detect the pattern of the fourth case VPC_CASE4 in the four valid pages 1132 to 1138 positioned on the 7$^{th}$ to 10$^{th}$ indices INDEX 7 to INDEX 10.

Since each of the first to fourth cases VPC_CASE1 to VPC_CASE4 is detected once in the detected victim block 1150, the controller 130 may calculate a sum value $T_{VICTIM}$ obtained by summing all of the average GC operation times $T_{AVG1}$ to $T_{AVG4}$ for the first to fourth cases VPC_CASE1 to VPC_CASE4 as the estimated GC operation time TIME_GC_EST for the victim block 1050. The controller 130 may estimate the time taken for performing a GC operation with the detected victim blocks in order to obtain required free blocks during the specific time T_F by calculating the estimated GC operation time TIME_GC_EST for the victim blocks detected in the step S604.

Referring back to FIG. 6, in the step S608, the controller 130 may obtain a GC operation count COUNT_GC indicating a number of a GC operations to be performed during the estimated GC operation time TIME_GC_EST obtained in the step S606. As described above with reference to FIG. 4, the controller 130 may control the memory device 150 to perform a GC operation during the constant GC operation time T_G whenever the GC operation period arrives. The controller 130 may calculate the GC operation count COUNT_GC by dividing the estimated GC operation time TIME_GC_EST by the GC operation time T_G. For example, when the estimated GC operation time TIME_GC_EST is 100 seconds and the GC operation time T_G having a constant value is 1 second, the GC operation onto the detected victim blocks may be completed only after the GC operation is performed 100 times during the specific time T_F. Therefore, the controller 130 may calculate the GC operation count COUNT_GC as 100.

In step S610, the controller 130 may update the GC operation period AD_TRIG_P by dividing the specific time T_F by the GC operation count COUNT_GC obtained in the step S608. According to the embodiment of the present invention, the controller 130 may generate free blocks for as many as are required for the memory device 150 by performing a GC operation for the specific time T_F so as to secure a memory space, and at the same time, minimize the performance deterioration of a foreground operation by controlling the memory device 150 to perform the GC operation in a uniform period during the specific time T_F.

Figure 12:
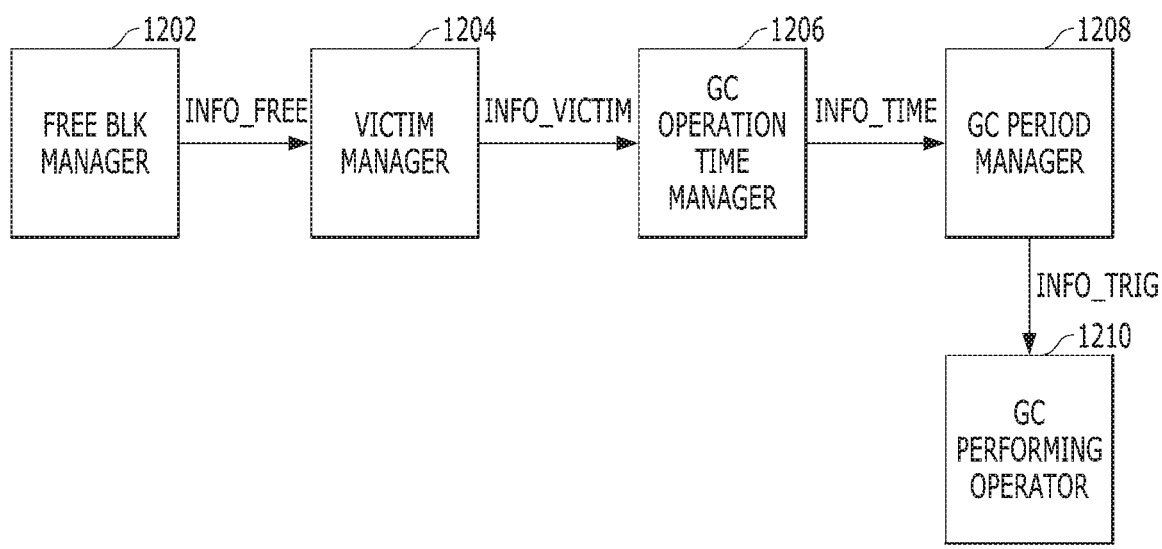
FIG. 12 is a block diagram illustrating the memory system 110 in accordance with an embodiment of the present invention.

FIG. 12 is a block diagram illustrating the memory system 110 in accordance with an embodiment of the present invention. FIG. 12 schematically shows elements related to the present invention in the data processing system 100 of FIG. 1.

The processor 134 described earlier with reference to FIG. 1 may include the free block manager 1202, the victim manager 1204, the GC operation time manager 1206, the GC period manager 1208, and the GC operator 1210.

The free block manager 1202 may obtain the required free block number REQ_FREEBLK for the specific time T_F. The free block manager 1202 may obtain the required free block number REQ_FREEBLK based on the size of a program command and the number of free blocks existing in the memory device 150. For example, as the size of the program command becomes larger than the number of free blocks existing in the memory device 150, the required free block number REQ_FREEBLK may become greater. On the contrary, as the size of the program command becomes smaller than the number of free blocks existing in the memory device 150, the required free block number REQ_FREEBLK may become smaller. The free block manager 1202 may provide the victim manager 1204 with information INFO_FREE on the required free block number REQ_FREEBLK.

The victim manager 1204 may detect victim blocks NUM_VICTIM onto which a GC operation is required to be performed to generate free blocks of the required free block number REQ_FREEBLK based on the information INFO_FREE. According to the embodiment of the present invention, when a GC operation is performed one or more times for the specific time T_F, the controller 130 may detect victim blocks NUM_VICTIM for as many as are required to generate free blocks of the required free block number REQ_FREEBLK. The victim manager 1204 may provide the GC execution time manager 1206 with information INFO_VICTIM on the detected victim blocks NUM_VICTIM.

The GC operation time manager 1206 may estimate the estimated GC operation time TIME_GC_EST to be taken for performing a GC operation onto the detected victim blocks based on the information INFO_VICTIM. According to the embodiment of the present invention, the GC operation time manager 1206 may classify the memory blocks into a plurality of cases based on the distribution of valid pages included in the memory blocks, and control the memory device 150 to perform a GC operation onto the memory blocks according to the classified cases. The GC operation time manager 1206 may measure the time taken for performing a GC operation which is required for each of the cases, and calculate the estimated GC operation time TIME_GC_EST based on the measured result.

Figure 13:
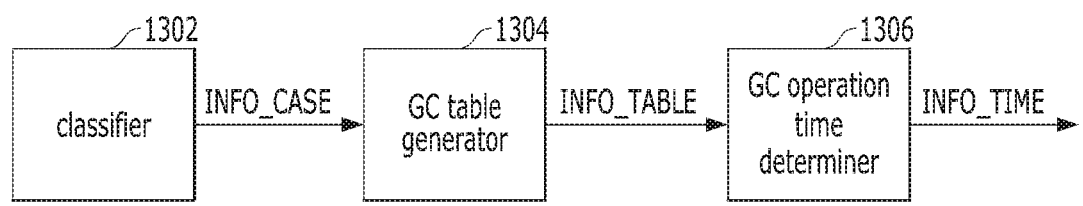
FIG. 13 is a block diagram illustrating a structure of a garbage collection operation time management unit.

FIG. 13 is a block diagram illustrating a structure of the GC operation time manager 1206.

The GC operation time manager 1206 may include a classifier 1302, a GC table generator 1304, and a GC operation time determiner 1306.

The classifier 1302 may classify the memory blocks into a plurality of cases VPC_CASE1 to VPC_CASE4 based on the valid page distribution within the memory blocks. According to the embodiment of the present invention, the classifier 1302 may classify super blocks into first to fourth cases VPC_CASE1 to VPC_CASE4 based on the valid page distribution within the super blocks, as described above with reference to FIG. 8. The classifier 1302 may provide the GC table generator 1304 with case information INFO_CASE on the classified cases. The distribution of valid pages may be related to the number of times that a read operation is required to be performed to read the valid pages of the same number.

The GC table generator 1304 may control the memory device 150 to perform a GC operation onto the super blocks respectively corresponding to the cases classified based on the provided case information INFO_CASE. As exemplified in FIG. 8, the GC table generator 1304 may perform a GC operation time measurement operation which includes measuring the time from a moment when a GC operation is performed onto the super blocks 802 to 808 respectively corresponding to the first to fourth cases VPC_CASE1 to VPC_CASE4 to a moment when the GC operation is completed, and record the measured time into a separate memory space. The GC table generator 1304 may repeatedly perform the operation of measuring the GC operation time GCPT for the super blocks 802 to 808 respectively corresponding to the first to fourth cases VPC_CASE1 to VPC_CASE4 for as many times as the predetermined threshold value TH, and record the measured result in a separate memory space.

The GC table generator 1304 may calculate the average GC operation time AVG_GCPT of the GC operation times GCPT_1 to GCPT_TH for the super blocks 802 to 808 corresponding to the first to fourth cases VPC_CASE1 to VPC_CASE4, and record the calculated average GC operation time AVG_GCPT into the table 1002. The GC table generator 1304 may provide the GC operation time determiner 1306 with information INFO_TABLE on the table 1002.

The GC operation time determiner 1306 may calculate an estimated GC operation time TIME_GC_EST by detecting each pattern of the cases VPC_CASE1 to VPC_CASE4 in the victim blocks detected in the step S604. The pattern may indicate the valid page distribution in a single super block, as described with reference to FIG. 8. According to the embodiment of the present invention, the GC operation time determiner 1306 may analyze the valid data of the detected victim block to detect each pattern of the cases VPC_CASE1 to VPC_CASE4 in the victim blocks. The GC operation time determiner 1306 may calculate the estimated GC operation time TIME_GC_EST by multiplying the average GC operation times AVG_GCPT for each of the first to fourth cases VPC_CASE1 to VPC_CASE4 by a number of detection of each pattern of the cases VPC_CASE1 to VPC_CASE4 in the victim blocks and summing all the multiplied values. The GC operation time determiner 1306 may provide the GC period manager 1208 with information INFO_TIME on the estimated GC operation time TIME_GC_EST.

The GC period manager 1208 may update the GC operation period AD_TRIG_P by dividing the specific time T_F by the GC operation count COUNT_GC. According to the embodiment of the is present invention, the controller 130 may generate free blocks for as many as are required by changing the GC operation period AD_TRIG_P such that the required free block number REQ_FREEBLK equal to the generated free block number GEN_FREEBLK during the specific time T_F. Also, the controller 130 may control the memory device 150 to perform the GC operation at a uniform period during the specific time T_F to minimize the performance deterioration of a foreground operation.

Hereinafter, the memory device in the memory system in accordance with the embodiment of the present invention will be described in more detail with reference to FIGS. 14 to 16.

Figure 14:
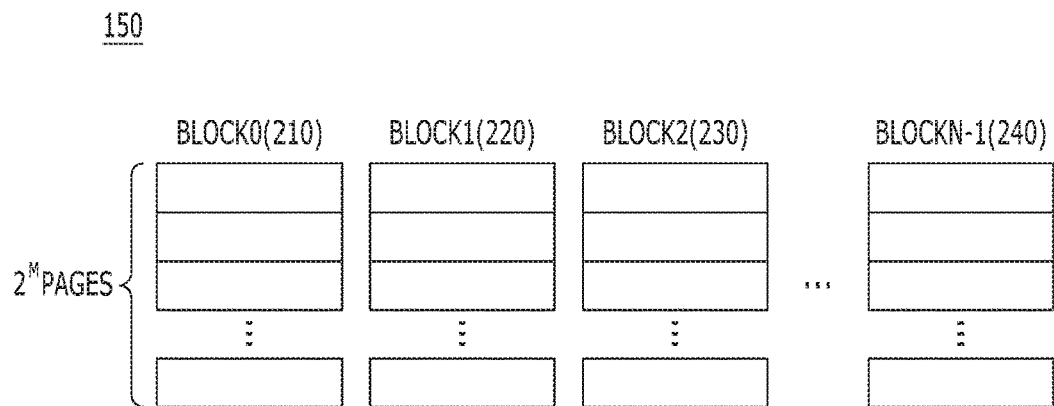
FIG. 14 is a schematic diagram illustrating an exemplary configuration of a memory device employed in the memory system shown in FIG. 1.

FIG. 14 is a schematic diagram illustrating the memory device 150. FIG. 15 is a circuit diagram illustrating an exemplary configuration of a memory cell array of a memory block 330 in the memory device 150. FIG. 16 is a schematic diagram illustrating an exemplary 3D structure of the memory device 150.

Referring to FIG. 14, the memory device 150 may include a plurality of memory blocks BLOCK0 to BLOCKN-1, where N is an integer greater than 1. Each of the blocks BLOCK0 to BLOCKN-1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN-1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TLC memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM)(STT-MRAM)).

The memory blocks 210, 220, 230, 240 may store the data transferred from the host 102 through a program operation, and may transfer data stored therein to the host 102 through a read operation.

Figure 15:
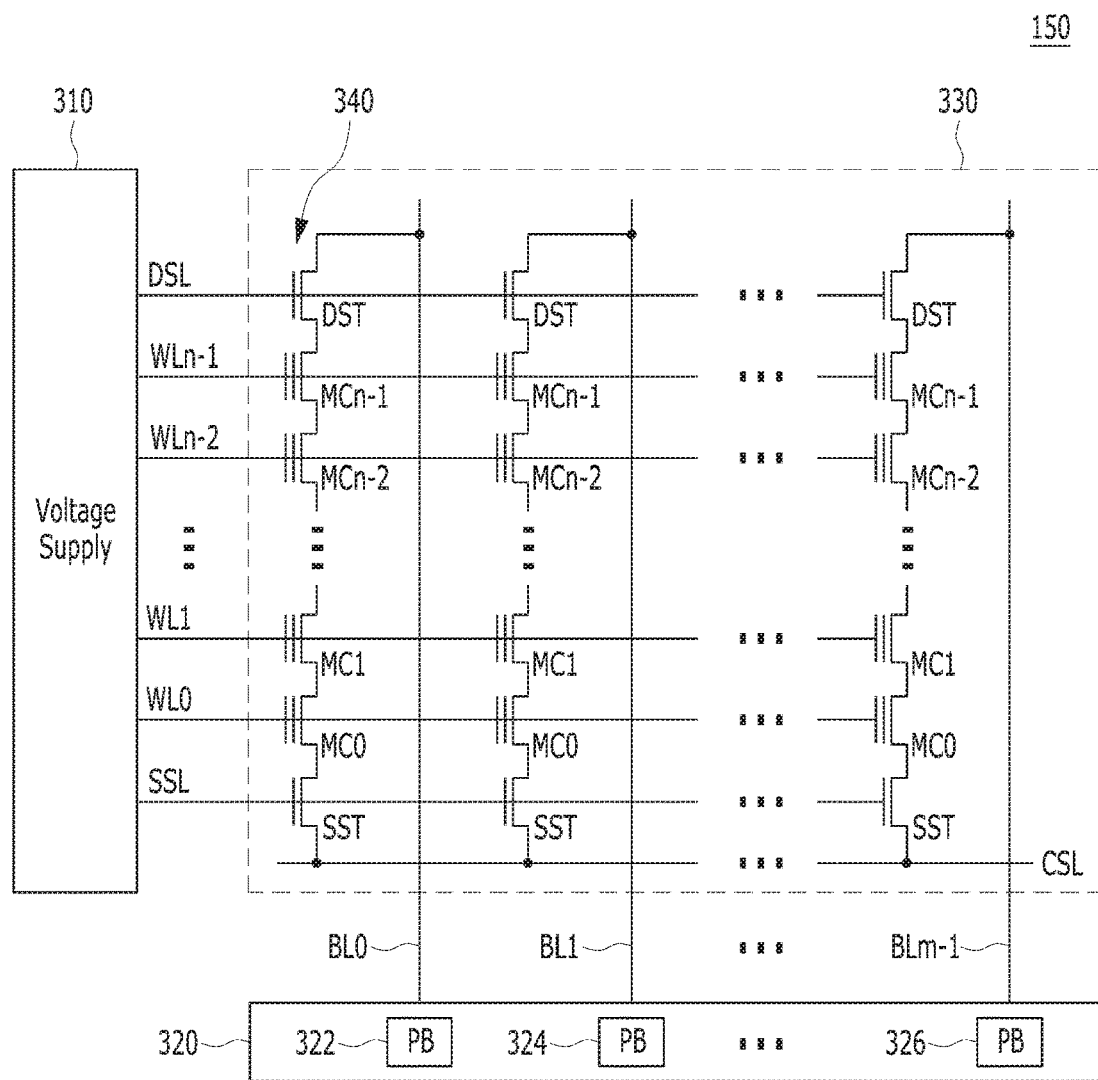
FIG. 15 is a circuit diagram illustrating an exemplary configuration of a memory cell array of a memory block in the memory device shown in FIG. 1.
Figure 16:
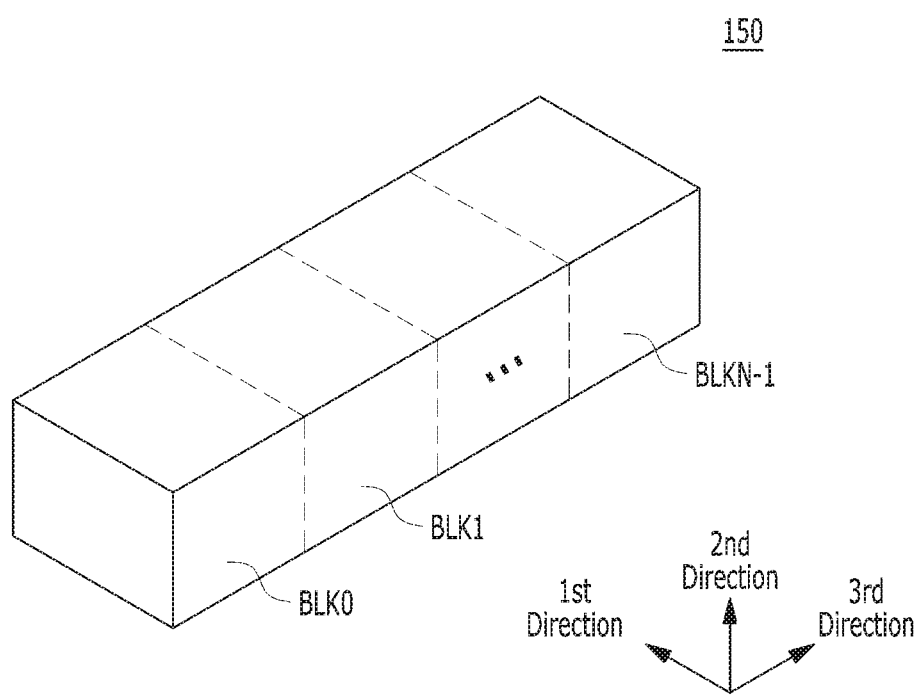
FIG. 16 is a block diagram illustrating a structure of a memory device of a memory system in accordance with an embodiment of the present invention.

Referring to FIG. 15, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 13, the first cell string is coupled to the first bit line BL0, and the last cell string is coupled to the last bit line BLm-1.

Although FIG. 15 illustrates NAND flash memory cells, the present disclosure is not limited thereto. It is noted that the memory cells may be NOR flash memory cells, or hybrid flash memory cells including two or more types of memory cells combined therein. Also, it is noted that the memory device 150 may be a flash memory device is including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 16, the memory device 150 may be embodied by a nonvolatile memory device having a 3D stack structure. When the memory device 150 has a 3D structure, the memory device 150 may include a plurality of memory blocks BLK0 to BLKN-1. Herein, FIG. 16 is a block diagram illustrating the memory blocks 152, 154 and 156 of the memory device 150 shown in FIG. 1. Each of the memory blocks 152, 154 and 156 may be realized in a 3D structure (or vertical structure). For example, the memory blocks 152, 154 and 156 may include structures of a three-dimensional structure that are extended in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS that are extended in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 among the memory blocks 152, 154 and 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Additionally, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150.

Hereafter, a data processing system and electronic devices to which the memory system 110 including the memory device 150 and the controller 130, which are described above by referring to FIGS. 1 to 16, in accordance with the embodiment of the present invention will be described in detail with reference to FIGS. 17 to 25.

Figure 17:
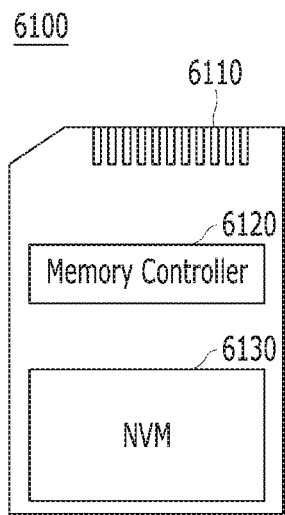
FIGS. 17 to 25 are diagrams schematically illustrating exemplary applications of the data processing system in accordance with various embodiments of the present invention.

FIG. 17 is a diagram schematically illustrating another example of the data processing system including the memory system in accordance with an embodiment. FIG. 17 schematically illustrates a memory card system to which the memory system may be applied.

Referring to FIG. 17, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or specific mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM), and a spin torque transfer magnetic RAM (STT-RAM).

The memory controller 6120 and the memory device 6130 may be integrated into a single semiconductor device to form a solid-state drive (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 18:
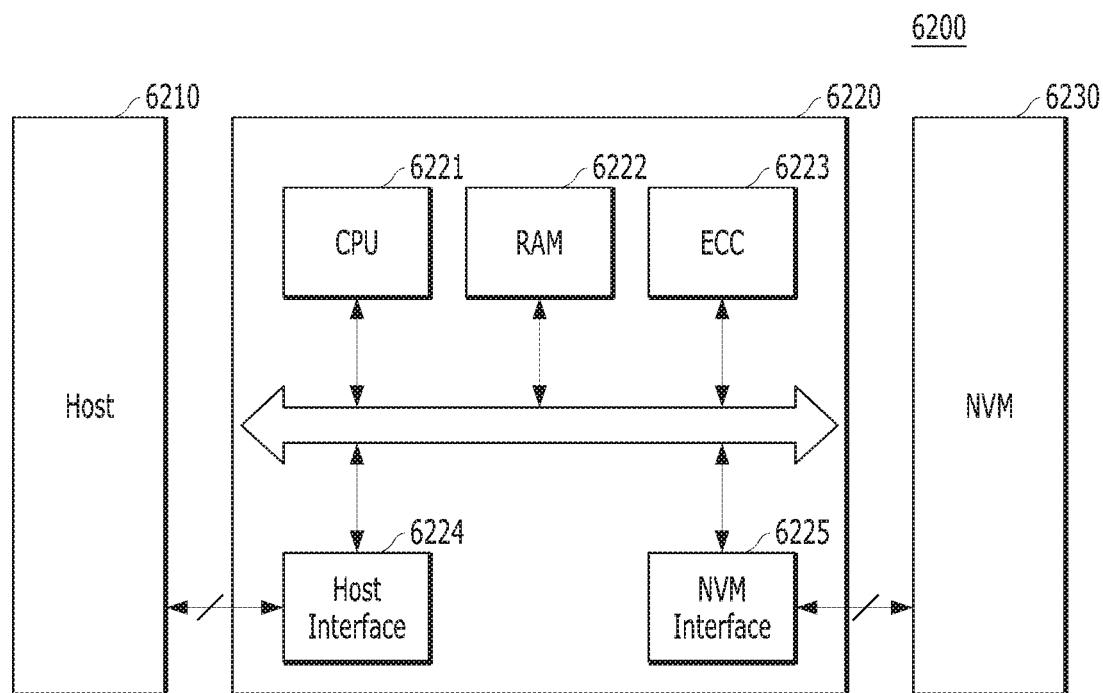

FIG. 18 is a diagram schematically illustrating another example of the data processing system including the memory system in accordance with an embodiment.

Referring to FIG. 18, the data processing system 6200 may include a memory device 6230 having one or more nonvolatile memories and a memory controller 6220 for controlling the memory device 6230. The data processing system 6200 illustrated in FIG. 18 may serve as a storage medium such as a memory card (CF, SD, micro-SD or the like) or USB device, as described with reference to FIGS. 1. The memory device 6230 may correspond to the memory device 150 in the memory system 110 illustrated in FIGS. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224, and a memory interface such as an NVM interface 6225.

The CPU 6221 may control overall operations on the memory device 6230, for example, read, write, file system management, and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system in accordance with an embodiment may be applied to wired/wireless electronic devices, particularly a mobile electronic device.

Figure 19:
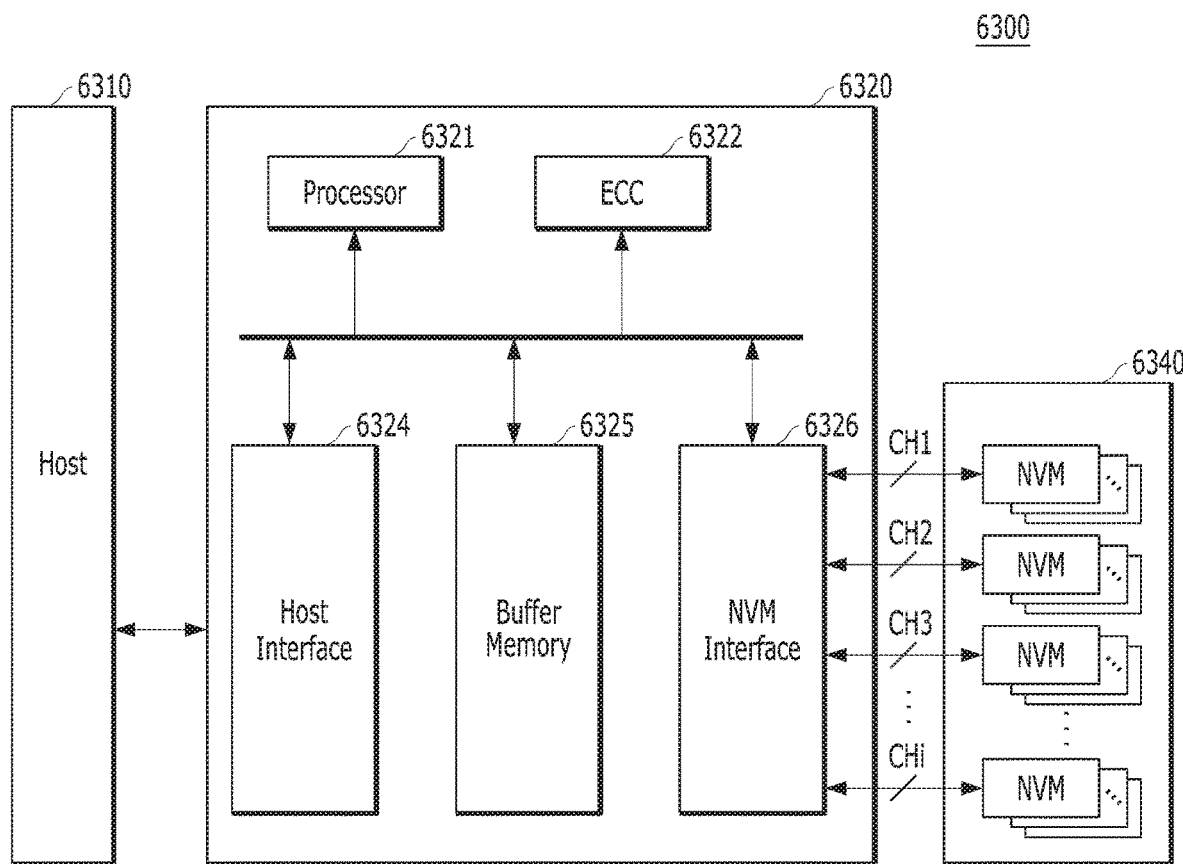

FIG. 19 is a diagram schematically illustrating another example of the data processing system including the memory system in accordance with an embodiment. FIG. 19 schematically illustrates an SSD to which the memory system may be applied.

Referring to FIG. 19, the SSD 6300 may include a controller 6320 and a memory device 6340 including a plurality of nonvolatile memories. The controller 6320 may correspond to the controller 130 in the memory system 110 of FIGS. 1, and the memory device 6340 may correspond to the memory device 150 in the memory system of FIGS. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 19 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 20:
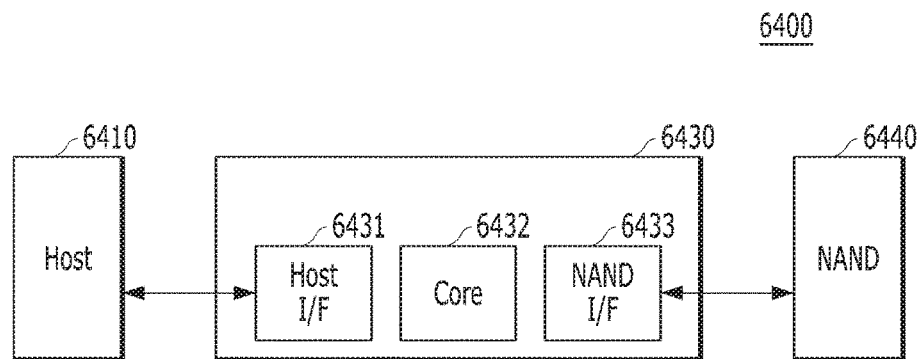

FIG. 20 is a diagram schematically illustrating another example of the data processing system including the memory system in accordance with an embodiment. FIG. 20 schematically illustrates an embedded Multi-Media Card (eMMC) to which the memory system may be applied.

Referring to FIG. 20, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels.

The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 21 to 24 are diagrams schematically illustrating other examples of the data processing system including the memory system in accordance with embodiments. FIGS. 21 to 24 schematically illustrate UFS (Universal Flash Storage) systems to which the memory system may be applied.

Referring to FIGS. 21 to 24, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 18 to 20, and the UFS cards 6530, 6630, 6730, 6830 may be embodied in the form of the memory card system 6100 described with reference to FIG. 17.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 21:
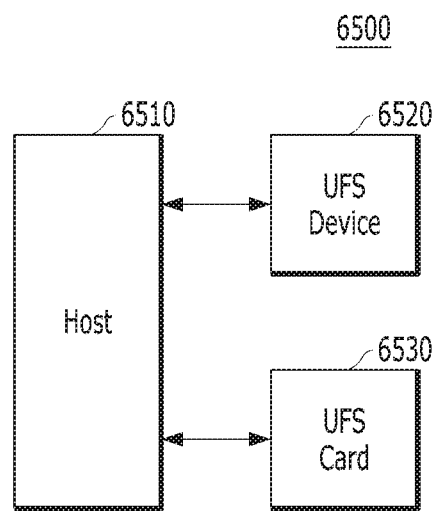

In the UFS system 6500 illustrated in FIG. 21, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 22:
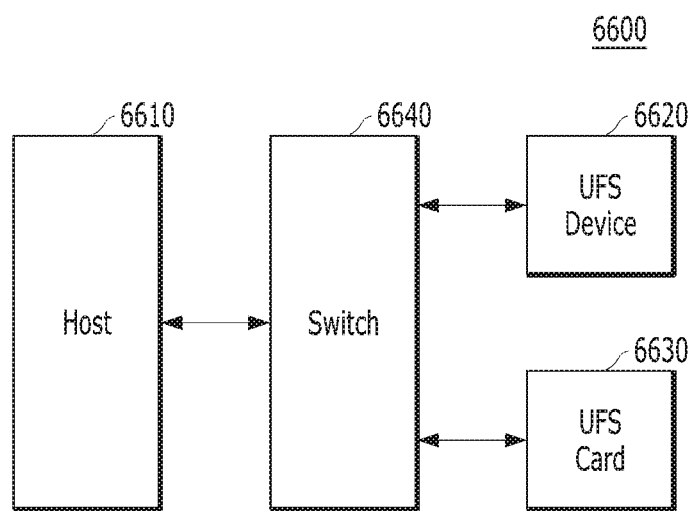

In the UFS system 6600 illustrated in FIG. 22, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 23:
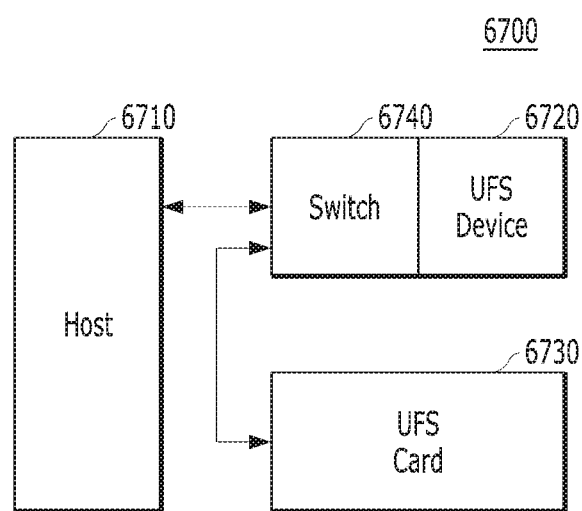

In the UFS system 6700 illustrated in FIG. 23, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 24:
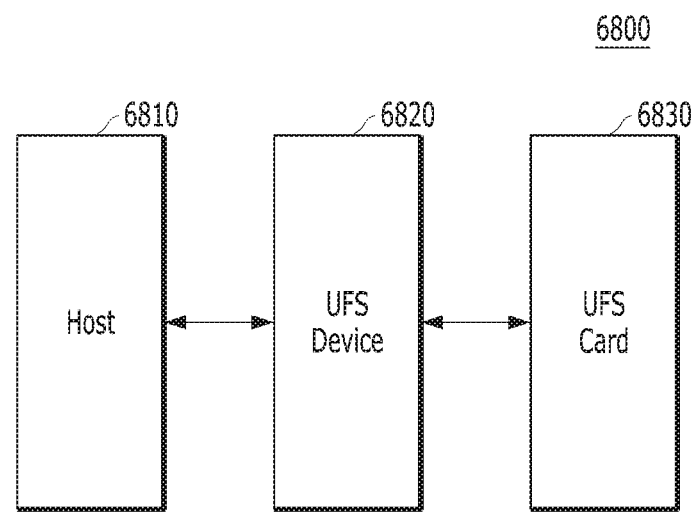

In the UFS system 6800 illustrated in FIG. 24, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 25:
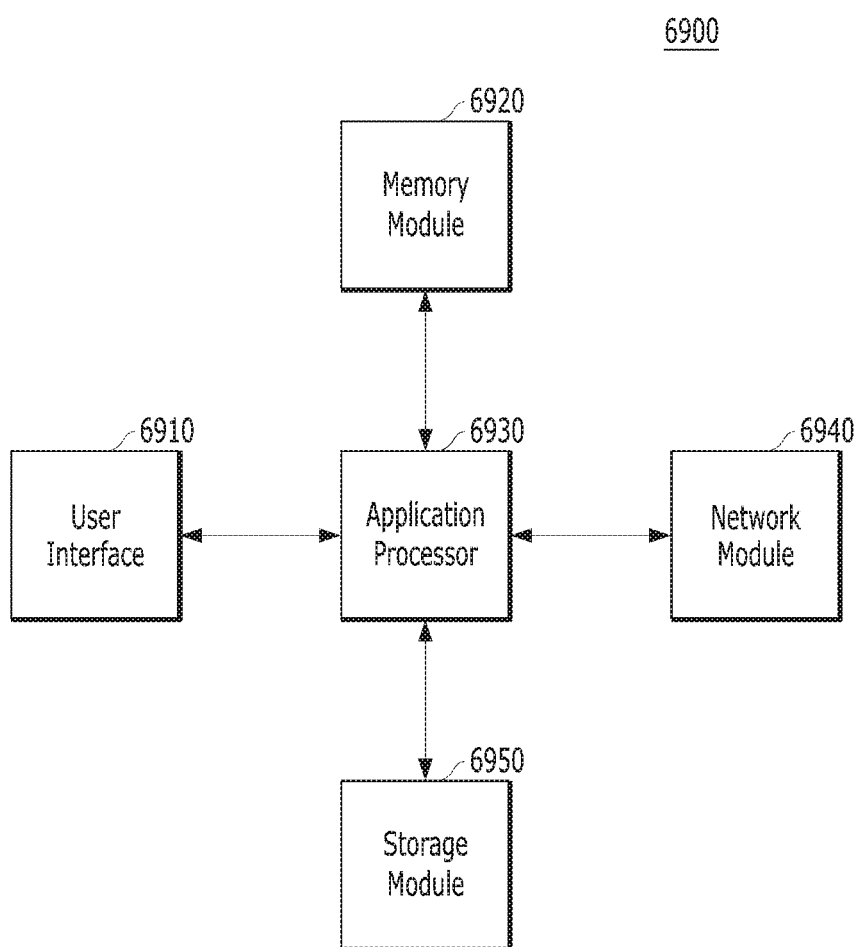

FIG. 25 is a diagram schematically illustrating another example of the data processing system including the memory system in accordance with an embodiment of the present invention. FIG. 25 is a diagram schematically illustrating a user system to which the memory system may be applied.

Referring to FIG. 25, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor is memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 19 to 24.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data is processed by the processor 6930 on a display/touch module of the mobile electronic device, or support a function of receiving data from a touch panel.

According to the embodiments of the present invention, the memory system may minimize the performance degradation of a foreground operation caused by a background operation by dynamically changing the garbage collection operation period.

While the present invention has been described with respect to the specific embodiments, it will be apparent to those skilled in the art that various changes and modifications may be made without departing from the spirit and scope of the invention as defined in the following claims.

What is claimed is:

1. A memory system comprising:
a memory device; and
a controller suitable for performing:
a free block management operation of detecting victim blocks onto which a garbage collection operation is to be performed to generate required free blocks;
a garbage collection operation time management operation of calculating an estimated garbage collection operation time for the detected victim blocks; and
a garbage collection operation period management operation of dynamically changing a garbage collection operation period based on the estimated garbage collection operation time and periodically performing a garbage collection operation based on the garbage collection operation period during a specific time,
wherein the controller repeatedly performs, whenever an update period arrives, the free block management operation, the garbage collection operation time management operation and the garbage collection operation period management operation.

2. The memory system of claim 1, wherein the controller performs a test garbage collection operation onto memory blocks corresponding to a plurality of cases classified based on a valid page distribution to measure time taken for performing the test garbage collection operation.

3. The memory system of claim 2, wherein the controller determines the valid page distribution based on a number of times a read operation is required to be performed in order to read all valid data included in each of the memory blocks during the test garbage collection operation.

4. The memory system of claim 3, wherein the controller reads valid data belonging to a single index of a memory block by a single read operation.

5. The memory system of claim 2, wherein the controller repeatedly performs the test garbage collection operation as many times as a predetermined threshold value.

6. The memory system of claim 5, wherein the controller respectively calculates an average of measured results obtained by repeatedly performing the test garbage collection operation for as many times as the predetermined threshold value for each of the classified cases.

7. The memory system of claim 6, wherein the controller obtains the estimated garbage collection operation time by detecting one or more valid page distributions of the classified cases within the detected victim blocks and summing all of the averages for the detected valid page distributions.

8. The memory system of claim 1, wherein the controller obtains a count value by dividing the estimated garbage collection operation time by a garbage collection operation time having a constant value.

9. The memory system of claim 8, wherein the controller obtains the garbage collection operation period by dividing the specific time by the count value.

10. The memory system of claim 1, wherein the required free blocks are as many as required during the specific time.

11. A method for operating a memory system, the method comprising:
- a free block management operation of detecting victim blocks onto which a garbage collection operation is to be performed to generate required free blocks;
- a garbage collection operation time management operation of calculating an estimated garbage collection operation time for the detected victim blocks; and
- a garbage collection operation period management operation of dynamically changing a garbage collection operation period based on the estimated garbage collection operation time and periodically performing a garbage collection operation based on the garbage collection operation period during a specific time,
- wherein the free block management operation, the garbage collection operation time management operation and the garbage collection operation period management operation are repeatedly performed whenever an update period arrives.

12. The method of claim 11, wherein the garbage collection operation time management operation includes performing a test garbage collection operation onto memory blocks corresponding to a plurality of cases classified based on a valid page distribution to measure time taken for performing the test garbage collection operation.

13. The method of claim 12, wherein the garbage collection operation time management operation includes determining the valid page distribution based on a number of times a read operation is required to be performed in order to read all valid data included in each of the memory blocks during the test garbage collection operation.

14. The method of claim 13, wherein the garbage collection operation time management operation includes reading valid data belonging to a single index of a memory block by a single read operation.

15. The method of claim 12, wherein the garbage collection operation time management operation includes repeatedly performing the test garbage collection operation as many times as a predetermined threshold value.

16. The method of claim 15, wherein the garbage collection operation time management operation includes respectively calculating an average of a measured result obtained by repeatedly performing the test garbage collection operation as many times as the predetermined threshold value for each of the classified cases.

17. The method of claim 16, wherein the garbage collection operation time management operation includes obtaining the estimated garbage collection operation time by detecting one or more valid page distributions of the classified cases within the detected victim blocks and summing all of the averages for the detected valid page distributions.

18. The method of claim 11, wherein the garbage collection operation period management operation includes obtaining a count value by dividing the estimated garbage collection operation time by a garbage collection operation time having a constant value.

19. The method of claim 18, wherein the garbage collection operation period management operation includes obtaining the garbage collection operation period by dividing the specific time by the count value.

20. The method of claim 11, wherein the required free blocks are as many as are required during the specific time.

\* \* \* \* \*